(12) United States Patent
Green et al.

(10) Patent No.: US 9,651,188 B2
(45) Date of Patent: May 16, 2017

(54) EFFICIENTLY AND EASILY OPENING AND CLOSING A CANISTER VALVE

(71) Applicant: The Coca-Cola Company, Atlanta, GA (US)

(72) Inventors: C. Brad Green, Dacula, GA (US); Devon Browne, Atlanta, GA (US); Joseph Lehman, Atlanta, GA (US); Brent Burchfield, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 2 days.

(21) Appl. No.: 14/944,629

(22) Filed: Nov. 18, 2015

(65) Prior Publication Data
US 2016/0069499 A1    Mar. 10, 2016

Related U.S. Application Data

(62) Division of application No. 14/209,623, filed on Mar. 13, 2014, now Pat. No. 9,216,887.

(60) Provisional application No. 61/792,889, filed on Mar. 15, 2013.

(51) Int. Cl.
| | | |
|---|---|---|
| *F16L 55/07* | (2006.01) | |
| *B67D 1/04* | (2006.01) | |
| *F16L 29/02* | (2006.01) | |
| *B67D 1/00* | (2006.01) | |
| *B67D 1/12* | (2006.01) | |

(52) U.S. Cl.
CPC .............. *F16L 55/07* (2013.01); *B67D 1/008* (2013.01); *B67D 1/0406* (2013.01); *B67D 1/125* (2013.01); *F16L 29/02* (2013.01); *B67D 1/0021* (2013.01); *B67D 1/12* (2013.01); *Y10T 137/0318* (2015.04); *Y10T 137/0402* (2015.04); *Y10T 137/6966* (2015.04); *Y10T 137/8593* (2015.04)

(58) Field of Classification Search
CPC .......... F16L 55/07; F16L 29/02; B67D 1/008; B67D 1/125; B67D 1/0406; B67D 1/12; B67D 1/0021; Y10T 137/0402; Y10T 137/0318; Y10T 137/6966; Y10T 137/8593
USPC ................ 222/1, 325, 402.1, 402.13, 402.14
See application file for complete search history.

(56) References Cited

U.S. PATENT DOCUMENTS

| | | |
|---|---|---|
| 3,195,777 A | 7/1965 | Hart |
| 3,617,214 A | 11/1971 | Dolac |
| 4,111,338 A * | 9/1978 | Cheng ................. B65D 83/386 222/180 |
| 4,678,106 A | 7/1987 | Newell et al. |
| 4,960,261 A | 10/1990 | Scott et al. |
| 5,947,334 A | 9/1999 | Rudick et al. |
| 7,048,152 B2 | 5/2006 | Bunoz |
| 8,342,365 B2 * | 1/2013 | Snodgrass ............ B65D 83/262 222/1 |

(Continued)

FOREIGN PATENT DOCUMENTS

| | | |
|---|---|---|
| EP | 0 364 206 A1 | 4/1990 |
| EP | 1 767 262 A1 | 3/2007 |
| WO | 2011/124702 A2 | 10/2011 |

OTHER PUBLICATIONS

International Search Report and Written Opinion for PCT/US2014/029465 mailed Sep. 4, 2014, 11 pages.

*Primary Examiner* — Donnell Long

(57) ABSTRACT

The present disclosure relates to a canister connection apparatus designed to efficiently and easily connect a pressurized canister to an external system.

20 Claims, 9 Drawing Sheets

(56) References Cited

U.S. PATENT DOCUMENTS

| | | |
|---|---|---|
| 8,544,696 B2 | 10/2013 | Willemsen et al. |
| 2003/0097314 A1 | 5/2003 | Crisp, III et al. |
| 2004/0031816 A1* | 2/2004 | Schuman ................. A47K 5/14 |
| | | 222/181.3 |
| 2004/0251271 A1 | 12/2004 | Jackson et al. |
| 2008/0116223 A1 | 5/2008 | Stradella |
| 2010/0224651 A1 | 9/2010 | Zlatic |
| 2010/0237106 A1 | 9/2010 | Wolf et al. |
| 2011/0127290 A1* | 6/2011 | Law ......................... A47K 5/12 |
| | | 222/52 |
| 2013/0026665 A1 | 1/2013 | Buosi et al. |
| 2014/0054320 A1* | 2/2014 | Harris ..................... A47K 5/14 |
| | | 222/153.09 |

* cited by examiner

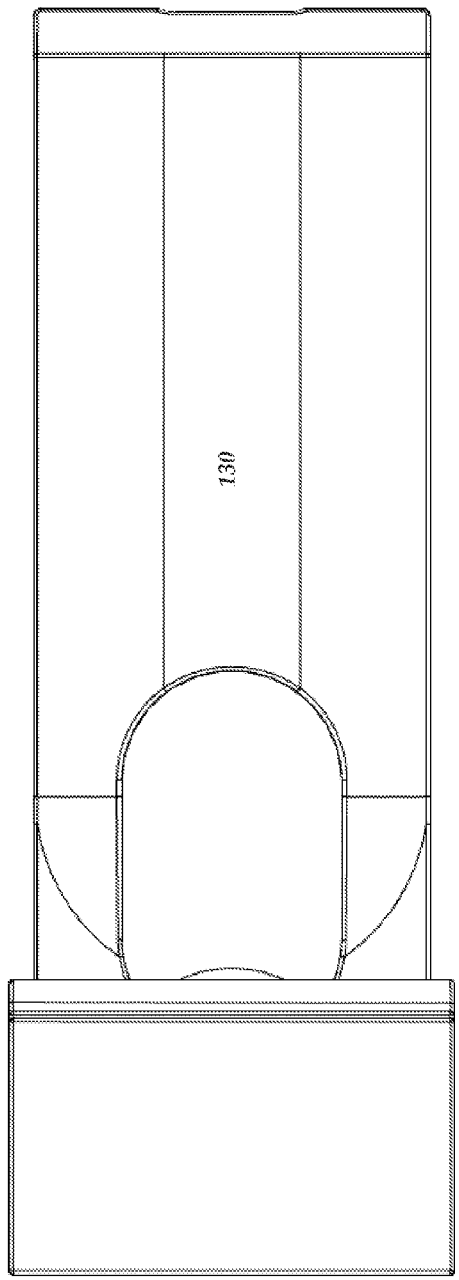
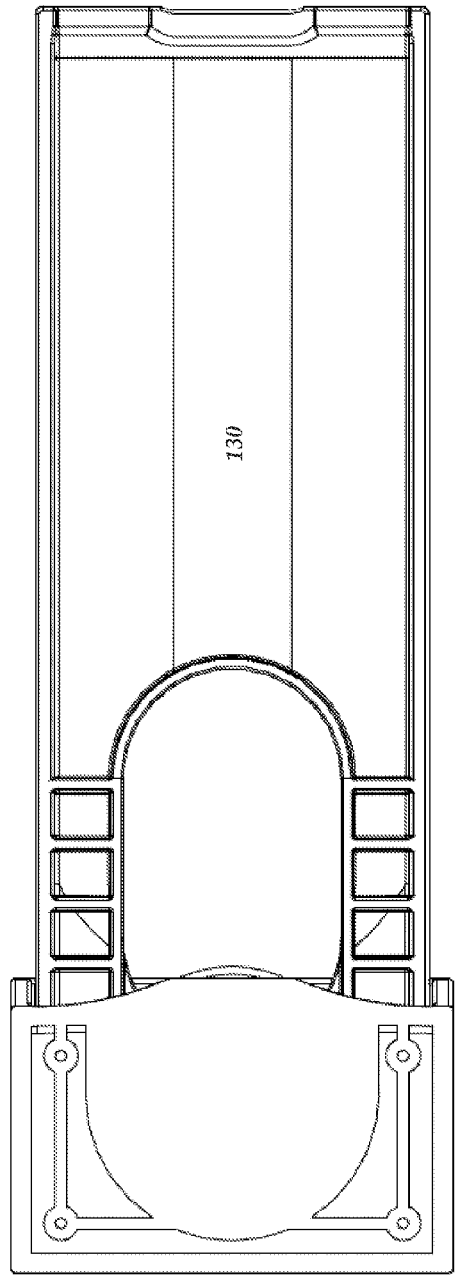

EFFICIENTLY AND EASILY OPENING AND CLOSING A CANISTER VALVE

BACKGROUND $CO_2$ gas may leak from a $CO_2$ canister when connecting the canister to an external system. This leakage reduces the amount of useful $CO_2$. The present disclosure addresses this issue and discloses a more convenient and simple connection mechanism.

BRIEF DESCRIPTION OF THE DRAWINGS

The accompanying drawings, which are incorporated in and constitute a part of this disclosure, illustrate various embodiments of the present invention. In the drawings:

FIGS. 8a-8b illustrate different views of a door of the canister connection apparatus.

DETAILED DESCRIPTION

Figure 1:
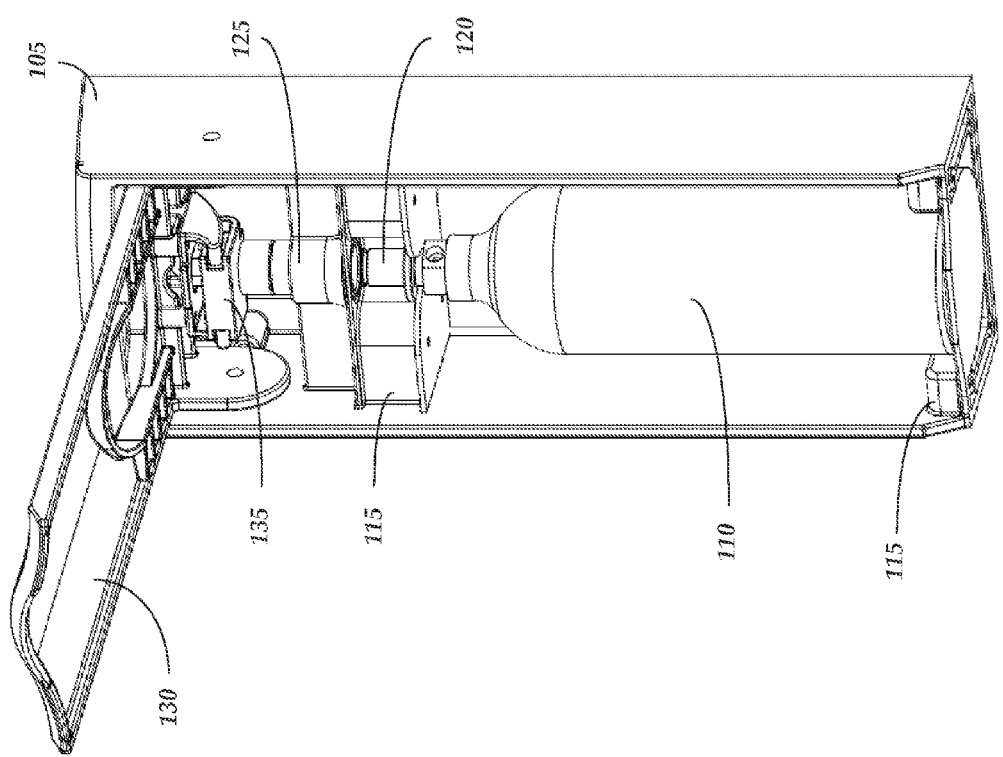
FIG. 1 illustrates one embodiment of a canister connection apparatus.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments of the invention may provide a canister connection apparatus designed to efficiently and easily connect a pressurized canister to an external system. FIG. 1 illustrates one embodiment of a canister connection apparatus 100. Apparatus 100 may receive a pressurized canister 110 in a housing 105. Housing 105 may be used to connect canister 110 to an external system. Canister 110 may be, but is not limited to, for example, a $CO_2$ canister.

The external system may be, but is not limited to, for example, a beverage dispensing system. Though FIG. 1 shows apparatus 100 to include a canister 110, a canister need not be included as part of apparatus 100. Rather, apparatus 100 may comprise a nest 115 designed to interface with various types of canisters having various volumes. Moreover, the term 'apparatus', as used herein, may include any combination of components or apparatuses.

Canister connection apparatus 100 may be designed to connect canister 110 to the external system efficiently and easily while mitigating the risk of gas leakage. Apparatus 100 may achieve this solution by sealing and covering a canister fitment 120 with a receiver fitment 125. Consistent with embodiments of the invention, apparatus 100 may comprise a movement mechanism 125 that may cause receiver fitment 125 to slide over canister fitment 120 as door 130 is lowered. In other embodiments, apparatus 100 may comprise a mechanism that inserts canister 110, along with canister fitment 120, into receiver fitment 125.

Generally stated, the lowering of door 130 may serve at least two purposes. First, it may cause receiver fitment 125 to connect with canister fitment 120 and open a canister valve to enable gas flow. Second, it may serve to protect a handler of canister 110 from any leaks that may occur during the connection process by shielding the canister valve from the handler.

As receiver fitment 125 connects with canister fitment 120, a valve opening component of receiver fitment 125 may open the canister valve, thereby allowing gas to flow from canister 110 into apparatus 100 (i.e. charging the apparatus). The charged apparatus 100 may then be connected to (or, in various embodiments, may already be connected to) an external system via, for example, a port in housing 105 and feed the external system with the gas contained in canister 110.

Figure 2:
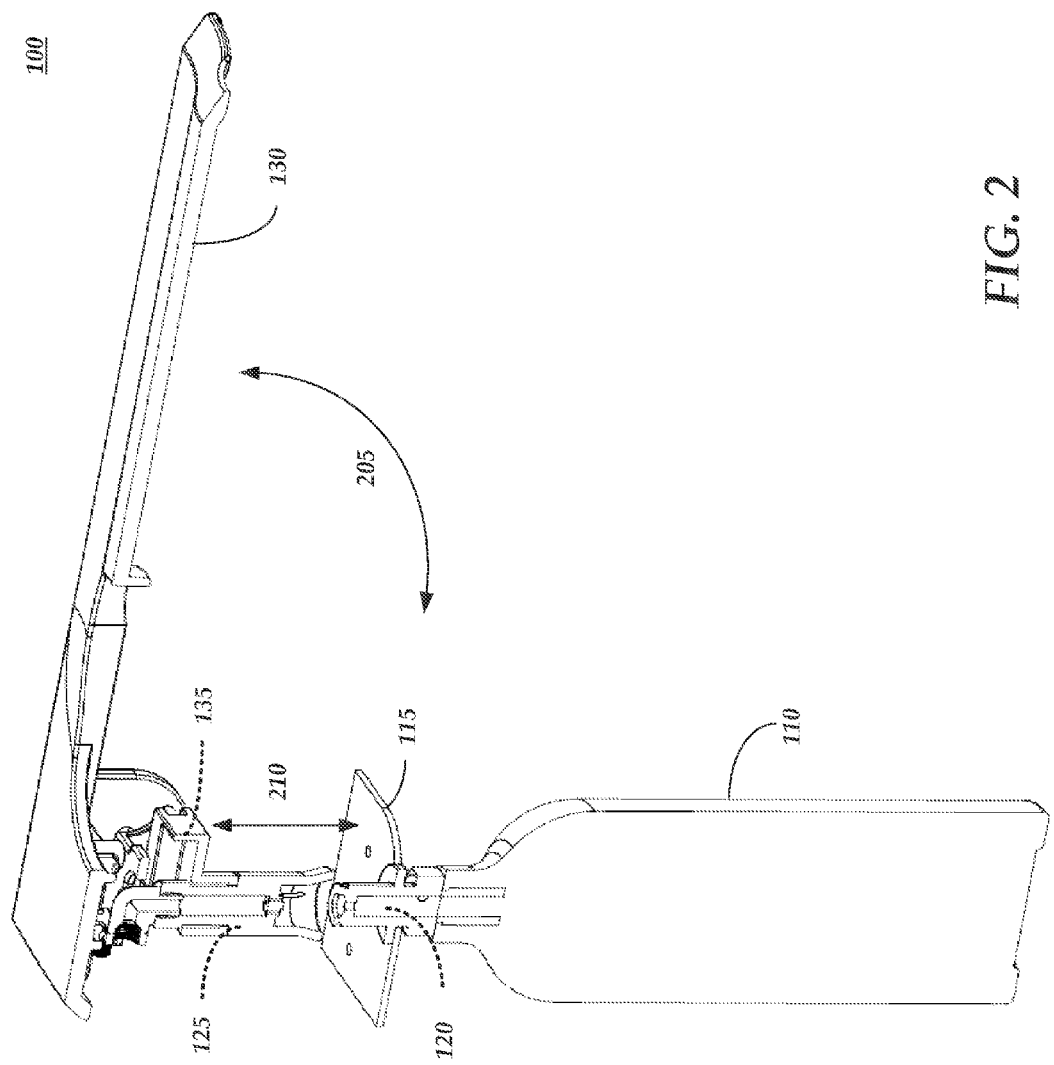
FIG. 2 illustrates a cross-sectional view of the canister connection apparatus.
Figure 3:
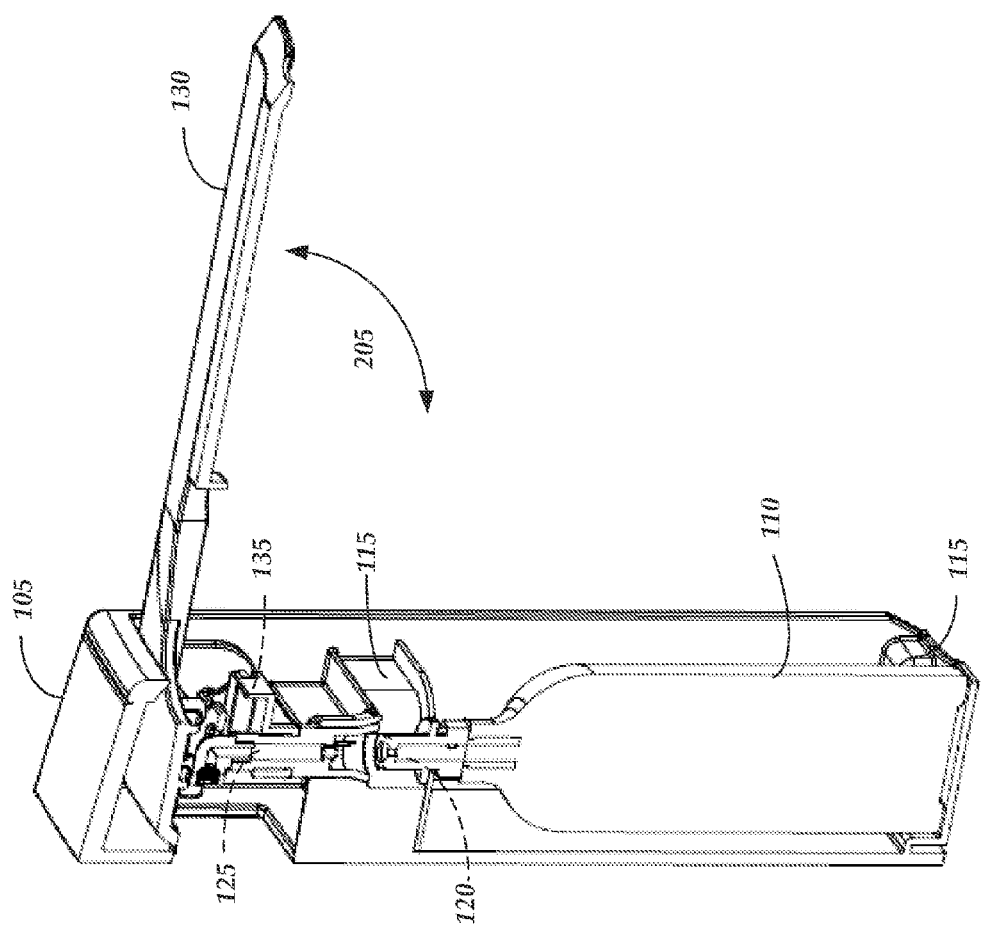
FIG. 3 illustrates another cross-sectional view of the canister connection apparatus.

FIG. 2 illustrates a cross-sectional view of canister connection apparatus 100. A user of canister connection apparatus 100 may first insert canister 110 into canister housing 105. Though hosing 105 is not show in FIG. 2, it is illustrated in FIG. 3. Canister housing 105 may be equipped with a canister nest 115 designed to secure canister 110 within canister housing 105. As mentioned above, nest 115 may be designed to receive and secure canisters of various types and sizes within canister housing 105. In various embodiments, the nest 115 may include a landing or other cutout designed to engage with a flange or other corresponding feature on the canister fitment 120 so as to secure the canister in the housing 105 and align the canister fitment 120 with the receiver fitment 125.

The user may then close door 130 of the apparatus 100 about an angle 205. As door 130 is closed, an over-center movement mechanism 135 causes receiver fitment 125 to slide about an axis 210 and cover canister fitment 120. For example, the over-center movement mechanism 135 may engage with a cam on the door 130. As the door 130 is moved, the over-center movement mechanism 135 may travel along the cam in such a way as to cause motion about axis 210. The axis 210 may be a vertical axis and/or may be parallel to an axis of a fluid flow pathway between the canister 110 and the receiver fitment 125. In various embodiments, a different sliding mechanism may be employed to cause canister 100 to be inserted into receiver fitment 125 as door 130 is closed. Additionally, receiver fitment 125 may be designed to clamp over canister fitment 120 once it is connected to canister fitment 120 so as to further secure canister 110. For example, a lower most portion of the receiver fitment 125 may be pushed onto the top surface of the flange on the canister fitment 120.

As receiver fitment 125 connects with canister fitment 120, an o-ring of canister fitment 120 seals the connection. In various embodiments of the invention, a valve opening component of receiver fitment 125 may force open a valve of canister 110 upon its connection to canister fitment 120. The opening of the valve may allow gas to flow from canister 110 to canister connection apparatus 100. In various embodiments, the o-ring of the canister fitment 120 seals the connection prior to the valve opening component of the receiver fitment 125 opening the valve of canister 110. In various embodiments, canister connection apparatus 100 may be designed so that the opening of canister valve occurs when door 130 has already been substantially closed.

The connection between receiver fitment 125 and canister fitment 120 effectively shield the user from accidental gas discharge in case of a defective o-ring or other anomaly. Moreover, since the canister valve may be opened only as door 130 is lowered, door 130 may also serve as shield protecting the user from accidental gas discharge.

As door 130 is opened about angle 205, receiver fitment 125 may be disconnected from canister fitment 120 in a similar way that it was connected to canister fitment 120 (e.g., about axis 210). In various other embodiments, canister fitment 120 may be disconnected from receiver fitment 125 in a similar way that it was connected to receiver fitment 125. The disconnection between receiver fitment 125 and canister fitment 120 may shut the canister valve, thereby stopping the gas flow. In this way, the user may be shielded from the potential gas discharge from disconnecting canister 110 from apparatus 100 in a similar way in which the user was shielded when connecting canister 110. In various embodiments, the o-ring of the canister fitment 120 seals the connection until after the valve opening component of the receiver fitment 125 disengages with the valve of canister 110 and allows the valve of the canister 110 to close.

Consistent with embodiments of the invention, canister connection apparatus 100 may comprise a locking mechanism. For example, door 130 may be latched to housing 105 when closed. The latch may comprise, but is not limited to, for example, an electrical solenoid. The opening of door 130 may be, for example, password protected. Any suitable locking mechanism may be used.

Figure 4:
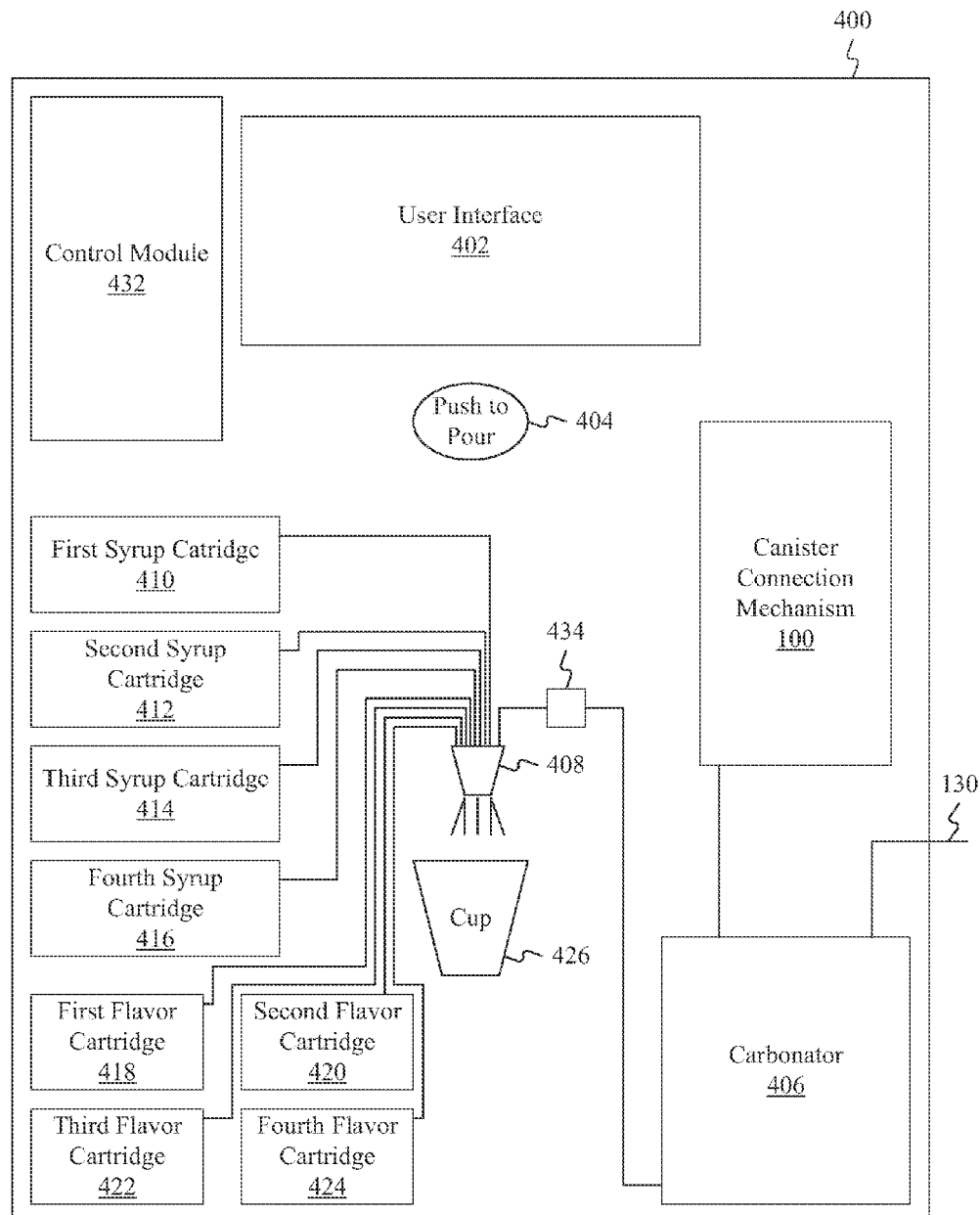
FIG. 4 illustrates a block diagram of a system including a canister connection apparatus.

FIG. 4 illustrates a system comprising canister connection apparatus 100. The system may comprise a beverage dispenser 400 and includes a user interface 402, a push to pour button 404, a carbonator 406, and a nozzle 408. Syrups may be stored in a plurality of syrup cartridges (e.g., a first syrup cartridge 410, a second syrup cartridge 412, a third syrup cartridge 414, and a fourth syrup cartridge 416). Flavors may be stored in a plurality of flavor cartridges (e.g., a first flavor cartridge 118, a second flavor cartridge 420, a third flavor cartridge 422, a fourth flavor cartridge 424). The plurality of syrup cartridges and the plurality of flavor cartridges are connected to the nozzle 408.

During operation, a user may select a beverage using the user interface 402. When the user presses the push to pour button 404, carbonated water flows from the carbonator 406 to the nozzle 408 and the appropriate syrups and/or flavors flow from the plurality of syrup cartridges and/or the plurality of flavor cartridges. In a post mix beverage dispenser the, the syrups, flavors, and carbonated water mix about the nozzle 408. For example, if a user selects a cherry flavored cola, carbonated water will flow from the carbonator 406 to the nozzle 408. The cola syrup and cherry flavoring will flow from the appropriate cartridges to the nozzle 408. The ingredients will then flow through the nozzle 408 and may air mix within the exiting fluid stream and a cup 426.

The carbonated water is formed within the carbonator 406. To form the carbonated water, $CO_2$ flows from a carbon dioxide source (e.g., canister connection apparatus 100) to the carbonator 406. Still water may flow into the carbonator 406 from an external source 430. The cooperation of the beverage dispenser may be controlled by a control module 432. The control module 432 may also monitor a backpressure, via a pressure sensor 434, within the plumbing between the carbonator 406 and the nozzle 408.

Figure 5B:
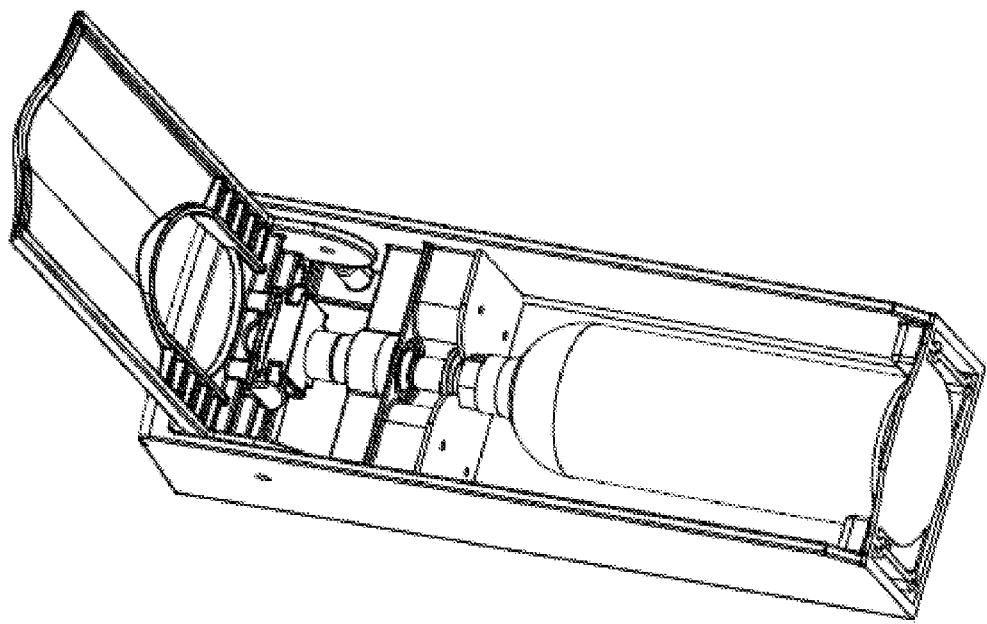
FIGS. 5a-5b illustrate three dimensional views of the canister connection apparatus.
Figure 5A:
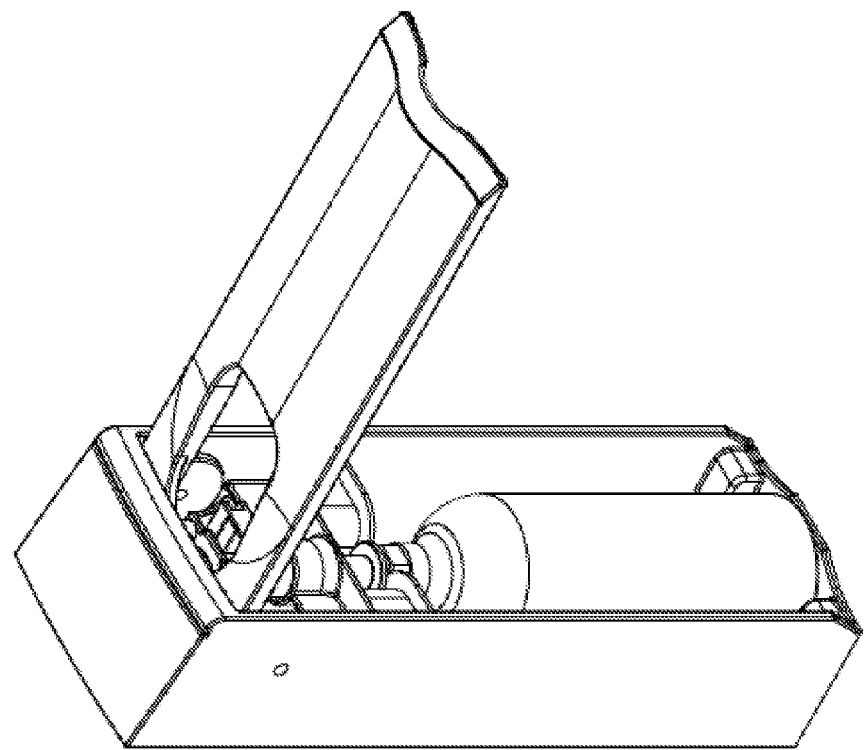
Figure 6B:
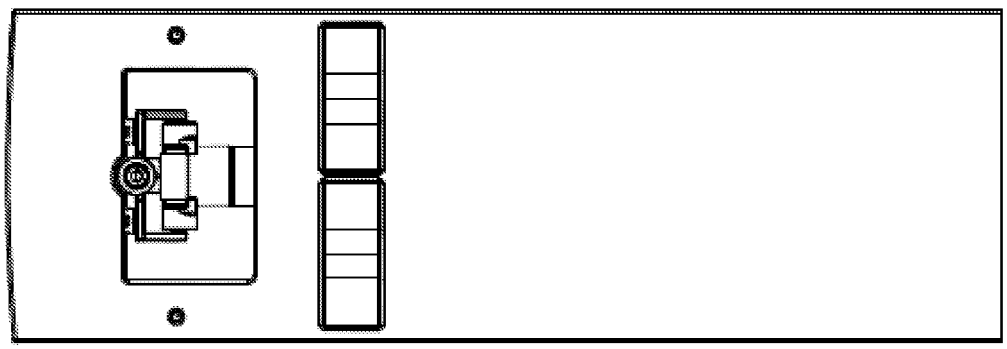
FIGS. 6a-6b illustrate a front view and a back view of the canister connection apparatus.
Figure 6A:
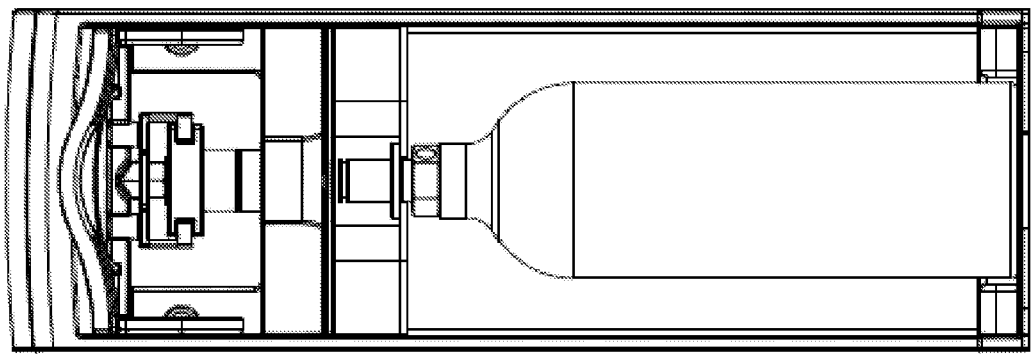
Figure 7B:
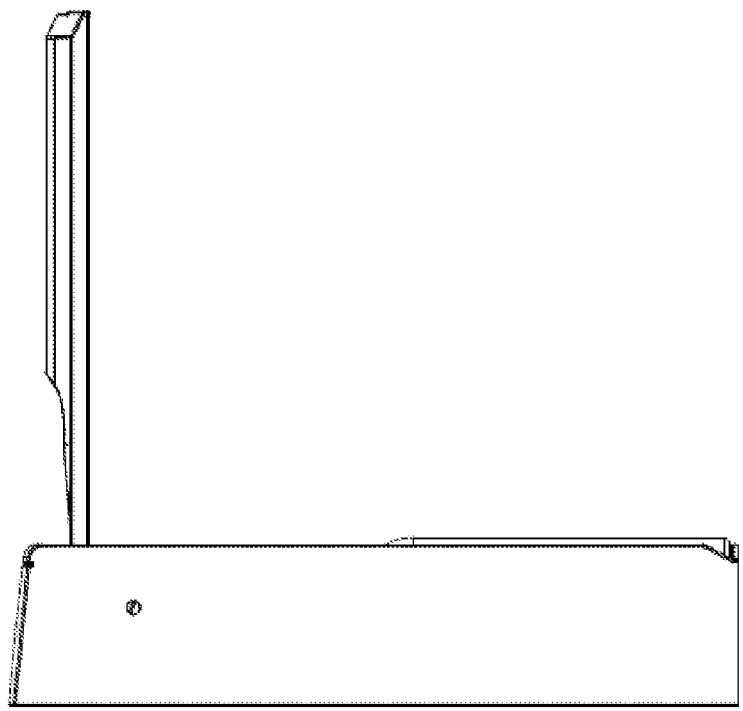
FIGS. 7a-7b illustrate side views of the canister connection apparatus.
Figure 7A:
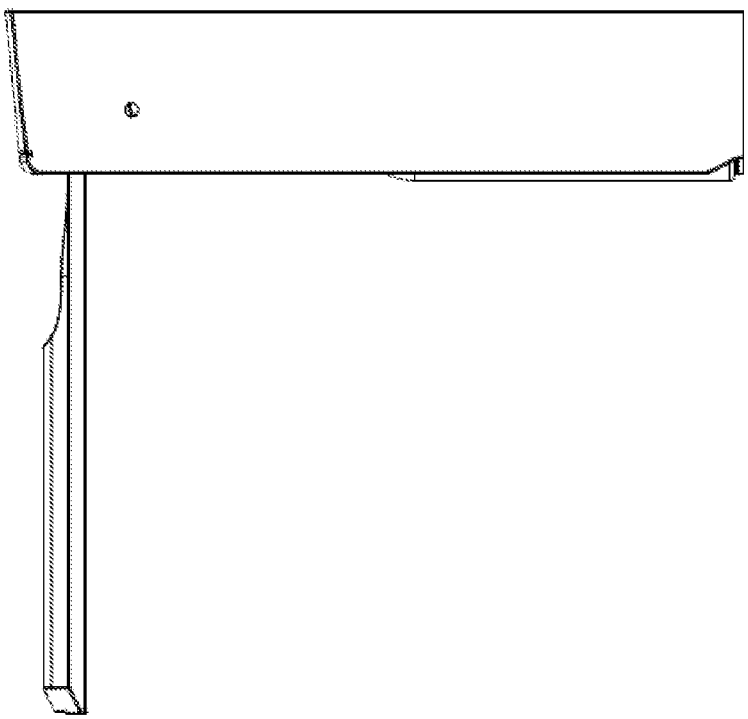
Figures 9A, 9B:
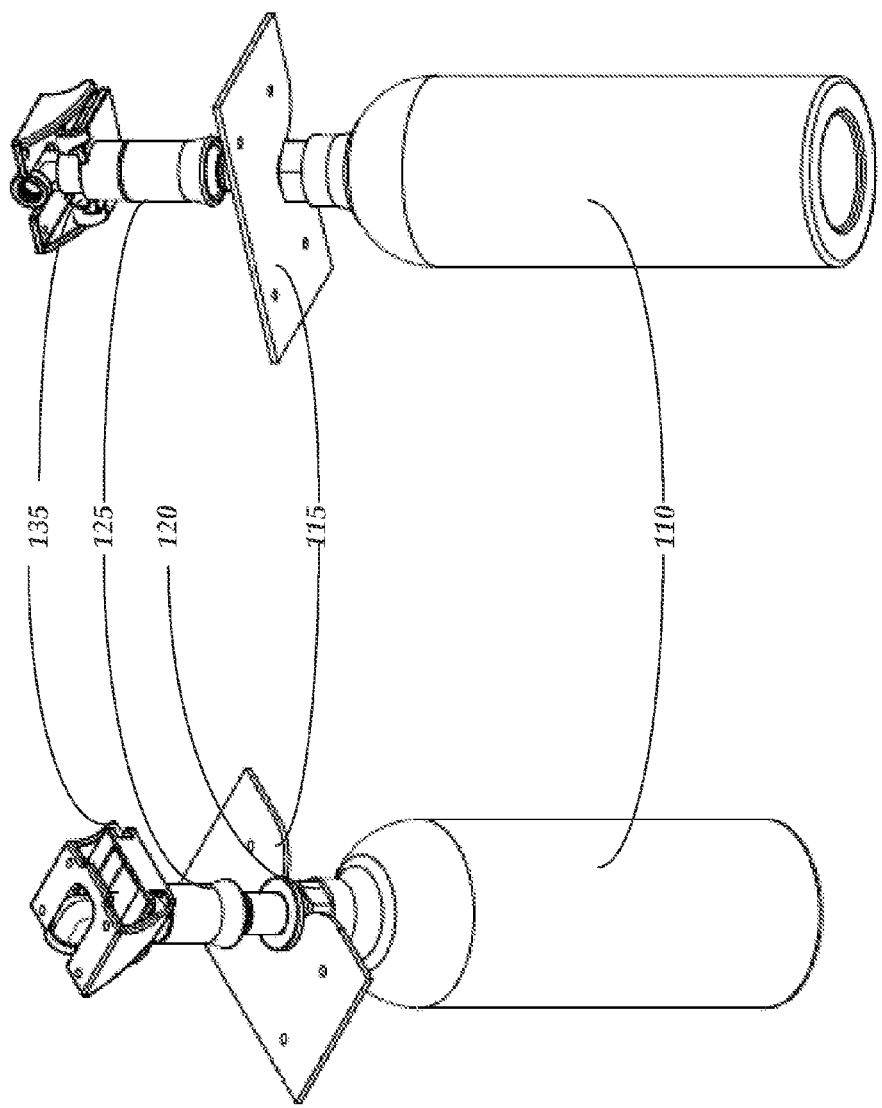
FIGS. 9a-9b illustrate three dimensional views of canister connection apparatus components.

FIG. 5a is a first three dimensional view of canister connection apparatus 100. FIG. 5b is a second three dimensional view of canister connection apparatus 100. FIG. 6a is a front view of canister connection apparatus 100. FIG. 6b is a back view of canister connection apparatus 100. FIG. 7a is a first side view of canister connection apparatus 100. FIG. 7b is a second side view of canister connection apparatus 100. FIG. 8a is a front view door 130. FIG. 8b is a back view door 130. FIGS. 9a-9B are three dimensional view of canister 110, nest 115, canister fitment 120, receiver fitment 125, and movement mechanism 135.

We claim:

1. A method comprising:
   receiving a canister in a canister connection housing, the canister comprising a canister fitment and a canister valve, the housing comprising a receiver fitment and a door; and
   lowering the receiver fitment of the housing over the canister fitment, the lowering of the receiver fitment being caused by a closing of the housing door.

2. The method of claim 1, wherein receiving the canister in the housing comprises receiving the canister into a nest of the housing for securing the canister within the housing.

3. The method of claim 2, wherein securing the canister within the housing comprises securing the canister within the housing in such a way that the lowering of the receiver fitment aligns to connect with the canister fitment upon a closing of the housing door.

4. The method of claim 1, wherein the closing of the housing door causes the lowering of the receiver fitment by way of an over-center movement mechanism configured to slide the receiver fitment over the canister fitment.

5. The method of claim 1, wherein lowering the receiver fitment of the housing over the canister fitment comprises connecting the receiver fitment with the canister fitment.

6. The method of claim 5, wherein connecting the receiver fitment with the canister fitment comprises causing the canister valve to open.

7. The method of claim 6, further comprising closing the canister valve, wherein closing the canister valve comprises disconnecting the receiver fitment from the canister fitment, wherein disconnecting the receiver fitment from the canister fitment is caused by an opening of the housing door.

8. The method of claim 5, further comprising disconnecting the receiver fitment from the canister fitment, wherein disconnecting the receiver fitment from the canister fitment is caused by an opening of the housing door.

9. The method of claim 1, further comprising raising the receiver fitment, the raising of the receiver fitment being caused by an opening of the housing door.

10. A method of connecting a canister to an external system, the method comprising:
    installing a canister in a nest located in a canister housing, the canister comprising a canister fitment and a canister valve, the canister housing comprising a receiver fitment, a door, and an over-center movement mechanism that is connected to the door and the receiver fitment;
    rotating the door about an angle so as to close the door;
    lowering the receiver fitment along an axis as the door is rotated about the angle by using the over-center movement mechanism; and
    sliding the receiver fitment of the housing over the canister fitment.

11. The method of claim 10, wherein the external system is a beverage dispensing system.

12. The method of claim 10, wherein sliding the receiver fitment over the canister fitment comprises:
 connecting the receiver fitment with the canister fitment.

13. The method of claim 12, wherein connecting the receiver fitment with the canister fitment causes the canister valve to open.

14. The method of claim 10, further comprising:
 moving the receiver fitment along the axis towards the nest as the door is closed.

15. The method of claim 10, further comprising:
 raising the receiver fitment along the axis by opening the door.

16. The method of claim 15, wherein opening the door disconnects the receiver fitment from the canister fitment.

17. The method of claim 10, further comprising:
 closing the canister valve, wherein closing the canister valve comprises disconnecting the receiver fitment from the canister fitment; and
 wherein disconnecting the receiver fitment from the canister fitment is by opening of the door.

18. The method of claim 10, wherein the axis is parallel to an axis of a fluid flow pathway between the canister and the receiver fitment.

19. The method of claim 10, wherein the receiver fitment clamps over the canister fitment to secure the canister within the canister housing.

20. A method of connecting a canister to an external system, the method comprising:
 receiving a canister in a canister connection housing, the canister comprising a canister fitment and a canister valve, the canister connection housing comprising a receiver fitment and a door;
 connecting an over-center movement mechanism to a cam of the door, as the door is moved the over-center movement mechanism travels along the cam to cause motion about an axis; and
 lowering the receiver fitment along the axis over the canister fitment as the door is closed.

* * * * *